United States Patent
Tsuji

Patent Number: 5,569,810
Date of Patent: Oct. 29, 1996

[54] METHOD OF AND SYSTEM FOR PROCESSING HALOGENATED HYDROCARBONS

[75] Inventor: Osamu Tsuji, Ohotsu, Japan

[73] Assignee: Samco International, Inc., Kyoto, Japan

[21] Appl. No.: 398,178

[22] Filed: Mar. 2, 1995

[30] Foreign Application Priority Data

Mar. 18, 1994 [JP] Japan ................................. 6-074362
May 10, 1994 [JP] Japan ................................. 6-121923

[51] Int. Cl.⁶ .................................................. A62D 3/00
[52] U.S. Cl. ......................... 588/227; 588/212; 427/490; 204/157.15
[58] Field of Search ........................ 427/490; 588/212, 588/227; 204/157.15

[56] References Cited

U.S. PATENT DOCUMENTS

| | | | |
|---|---|---|---|
| 4,312,575 | 1/1982 | Peyman et al. | 351/160 H |
| 4,366,208 | 12/1982 | Akai et al. | 428/421 |
| 4,636,435 | 1/1987 | Yanagihara et al. | 428/336 |
| 4,729,906 | 3/1988 | Kleeberg et al. | 427/41 |
| 5,089,290 | 12/1992 | Kleeberg et al. | 427/41 |

*Primary Examiner*—Kathryn Gorgos
*Assistant Examiner*—C. Delacroix-Muirheid
*Attorney, Agent, or Firm*—Oliff & Berridge

[57] ABSTRACT

System for and a method of fixing chlorofluorocarbons or other halogenated hydrocarbons, for example, $CHF_3$ or $CCl_2F_2$ recirculated and collected or discharged from a dry etching apparatus, so as to make the chlorofluorocarbon or halogenated hydrocarbon harmless against the earth's ozone layer. A gaseous hydrocarbon like ethane, ethylene or acetylene gas is mixed with a chlorofluorocarbon or other halogenated hydrocarbon gas in a reaction tube 61. The mixed gas is then excited to a plasma state for plasma copolymerization. A solid copolymer of the halogenated hydrocarbon and the hydrocarbon generated by the plasma copolymerization is deposited and accumulated onto the inner wall of the reaction tube 61 or on a fixation member 14.

7 Claims, 6 Drawing Sheets

METHOD OF AND SYSTEM FOR PROCESSING HALOGENATED HYDROCARBONS

The present invention relates to a method of and system for processing halogenated hydrocarbons, which include collected chlorofluorocarbons and residual gases discharged from dry etching apparatus. The term 'halogenated hydrocarbon' used herein includes halogenated carbons like CFC-113 ($CCl_2F$—$CClF_2$) or carbon tetrafluoride ($CF_4$) which do not include hydrogen.

BACKGROUND OF THE INVENTION

Chlorofluorocarbons (CFCs) or Flons have in recent years been widely used as a coolant and cleaning agent. Since, however, it was revealed that they destroy the earth's ozone layer and contribute to global warming, it was decided in the Montreal Agreement that the use of CFCs should be eliminated throughout the world by the end of 1995. In order to meet this goal, various nations around the world are now actively collecting the remaining CFC gas reserves.

In dry etching using a reactive gas such as trifluoromethane ($CHF_3$) or dichlorodifluoromethane ($CCl_2F_2$), some portion of the reaction gas remains non-reacted and is discharged from the etching chamber. It is necessary therefore to provide a unit for processing such residual non-reacted halogenated hydrocarbon gas after the etching chamber of every dry etching machine in order to prevent the harmful gas from being released in the air.

Several methods have been proposed to change the collected CFCs to harmless substances which do not destroy the ozone layer. A typical conventional method is to decompose CFCs by heating them at high temperature, which of course requires a lot of energy. Another drawback is that decomposed CFCs generate various gases containing carbon, fluorine and chlorine which may be also harmful by themselves and require further processing to make them completely harmless.

Another method is proposed in the Publication No. H3-111065 of Unexamined Japanese Patent Application, in which ultraviolet ray of a certain wavelength is irradiated on CFCs to decompose them into $CF_2$, $C_2F_4$, and other fragments. This method has a similar drawback as above because the products $CF_2$, $C_2F_4$, etc. need further processing.

Conventional halogenated hydrocarbon processing systems provided to dry etching machines use an absorbent for absorbing the residual non-reacted halogenated hydrocarbon. The fixation of halogenated hydrocarbons by the conventional processing unit is, however, not complete and may cause desorption of the halogenated hydrocarbons from the absorbent unless the absorbent is properly treated.

In summary, there has been no effective method of completely making chlorofluorocarbons and halogenated hydrocarbons harmless.

SUMMARY OF THE INVENTION

The main object of the present invention is therefore to provide a new method and system in which halogenated hydrocarbons or chlorofluorocarbons are made completely harmless by solidifying them.

According to the present invention, the method of processing a chlorofluorocarbon gas comprises the following steps:

a. mixing a hydrocarbon gas with the chlorofluorocarbon gas to create a mixed gas; and b. exciting the mixed gas to a plasma state for plasma copolymerization, thereby generating a copolymer of molecules of the chlorofluorocarbon gas and the hydrocarbon gas, the copolymer being accumulated on a fixation member.

When CFC gas alone is excited into plasma, no polymerizing reaction takes place. When, however, hydrocarbon gas is added to the CFC gas, copolymerization occurs in the plasma of the mixed gas. The plasma polymerization proceeds successively via halide intermediates under adequate plasma conditions to generate high-molecular copolymers of the hydrocarbon and the chlorofluorocarbon. By providing a fixation member in the reaction chamber, the copolymers are deposited and accumulated on the fixation member. Thus the chlorofluorocarbon is fixed as the copolymer with the hydrocarbon on the fixation member and is made harmless. This effectively prevents the harmful chlorofluorocarbon from destroying the ozone layer.

Any of high-frequency plasma excitation, direct current plasma excitation, and micro-wave plasma excitation can be used in the present invention.

The present invention is also directed to a chlorofluorocarbon processing system, which includes:

a. a plasma processing chamber for containing a mixed gas of a chlorofluorocarbon gas and a hydrocarbon gas mixed at a predetermined mixture ratio, b. a pressure regulator for controlling a pressure of the mixed gas in the plasma processing chamber, and c. plasma generating means for exciting the mixed gas to a plasma state in the plasma processing chamber to generate a copolymer of molecules of the chlorofluorocarbon gas and the hydrocarbon gas.

It is preferred to place a fixation member in the plasma processing chamber to fix the copolymer thereon. It is further preferred that the fixation member has a large surface area to deposit and fix as much copolymer products as possible. After the plasma reaction is finished, the fixation member is taken out of the plasma processing chamber.

A vaporizer may be placed before the plasma processing chamber for vaporizing chlorofluorocarbons having a boiling point higher than the ambient temperature.

When CFC-113 ($CCl_2F$—$CClF_2$) is the target chlorofluorocarbon to be processed according to the present invention, a lower hydrocarbon gas containing three or less carbon atoms is preferably used as the hydrocarbon gas for obtaining a sufficient polymerization rate.

FIG. 3 is the graph of deposition rate v.s. the mixture ratio of CFC-113 and hydrocarbons of ethane ($C_2H_6$), ethylene ($C_2H_4$) and acetylene ($C_2H_2$). When ethane gas is mixed with CFC-113, the molar ratio of CFC-113 in the mixed gas is preferably 50–90%. When ethylene gas is mixed with CFC-113, the molar ratio of ethylene gas in the mixed gas is preferably 25–75%. And when acetylene gas is mixed with CFC-113, the molar ratio of acetylene gas in the mixed gas is preferably 15–65%.

The present invention is further directed to a method of processing a halogenated hydrocarbon. The method includes the steps of:

a. mixing a gaseous hydrocarbon with the halogenated hydrocarbon to create a gas mixture; and b. exciting the gas mixture to a plasma state for plasma copolymerization, thereby generating a solid copolymer of the halogenated hydrocarbon and the hydrocarbon.

In this method, the plasma reaction of the halogenated hydrocarbon with the gaseous hydrocarbon proceeds in the same manner as above. Any of high-frequency plasma generator, direct current plasma generator, or micro-wave plasma generator may also be used for the plasma excitation.

In another aspect of the present invention, a system for processing a halogenated hydrocarbon includes:

a. a reaction tube for allowing the halogenated hydrocarbon gas to flow therethrough;

b. a hydrocarbon supplying unit for introducing a hydrocarbon gas into the reaction tube to form a mixed gas of the halogenated hydrocarbon gas and the hydrocarbon gas therein, and c. a plasma generating unit placed in the vicinity of the reaction tube for exciting the mixed gas to a plasma state so as to generate a solid copolymer of molecules of the halogenated hydrocarbon and the gaseous hydrocarbon.

In this system, the gaseous hydrocarbon is introduced into the reaction tube by the hydrocarbon supplying unit while the halogenated hydrocarbon gas continuously flows through the reaction tube. The plasma generating unit is then activated to excite the mixture of the halogenated hydrocarbon and the gaseous hydrocarbon in the reaction tube to a plasma state, thereby generating solid copolymers of the halogenated hydrocarbon and the hydrocarbon. Since the copolymer products are solid, they precipitate into powders in the reaction tube or is deposited on the inner wall of the reaction tube. A fixation member can also be used in this case. The halogenated hydrocarbon is thus fixed and made harmless.

The system of the present invention is applicable to trichloroethane ($CCl_3$—$CH_3$), which is used as a cleaning agent but is also planned to be phased out by the end of 1995.

The method of the present invention can process halogenated hydrocarbons and halogenated carbons as well as chlorofluorocarbons. The system for processing halogenated hydrocarbons according to the present invention is preferably used as a post-processing unit of a dry etching apparatus. The system of the present invention effectively fixes the residual halogenated hydrocarbon and prevent it from being released in the air, compared to the conventional method of using mere absorbents.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
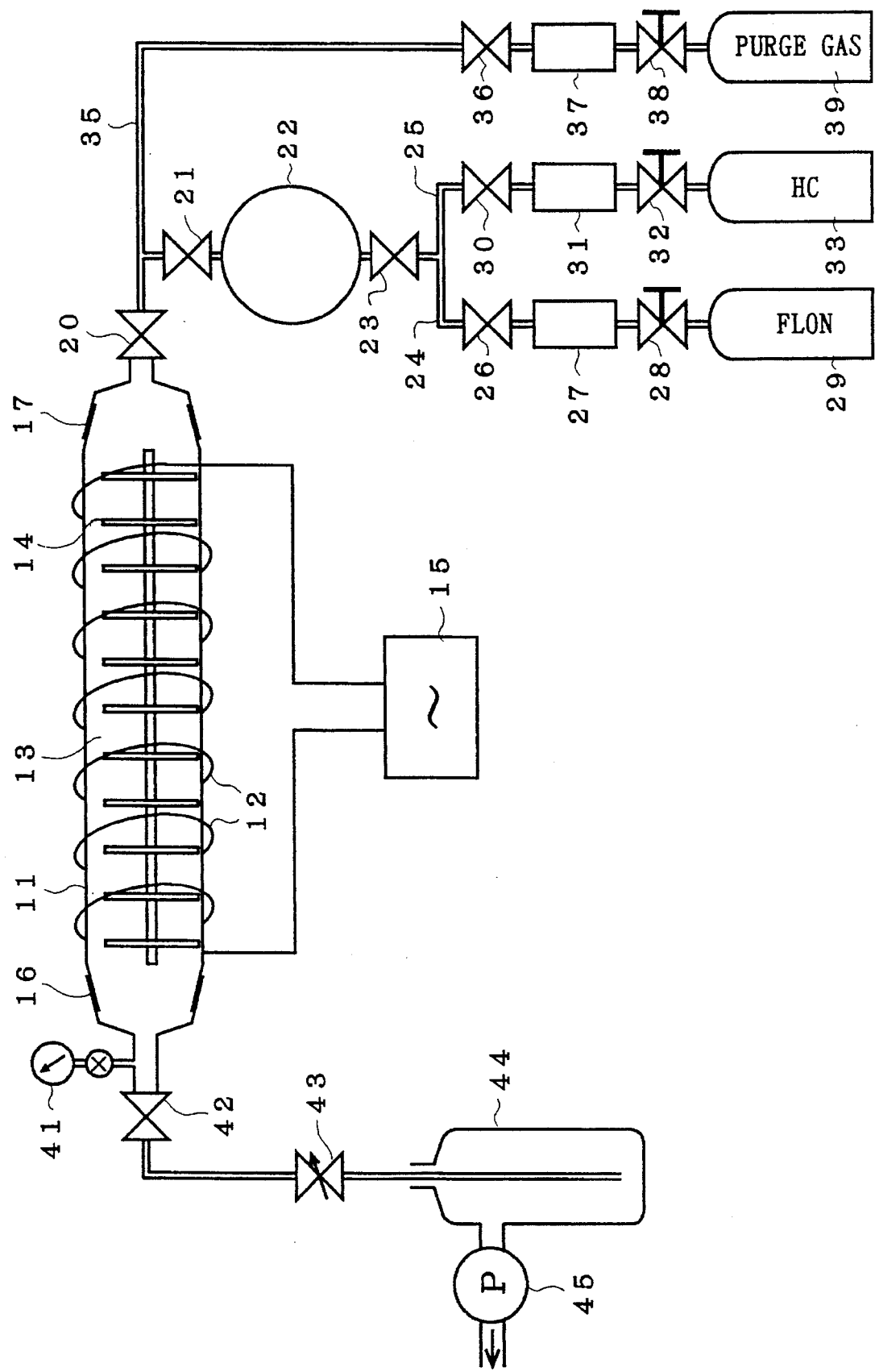
FIG. 1 is a schematic diagram of a system for processing chlorofluorocarbons as the first embodiment of the invention.
Figure 2:
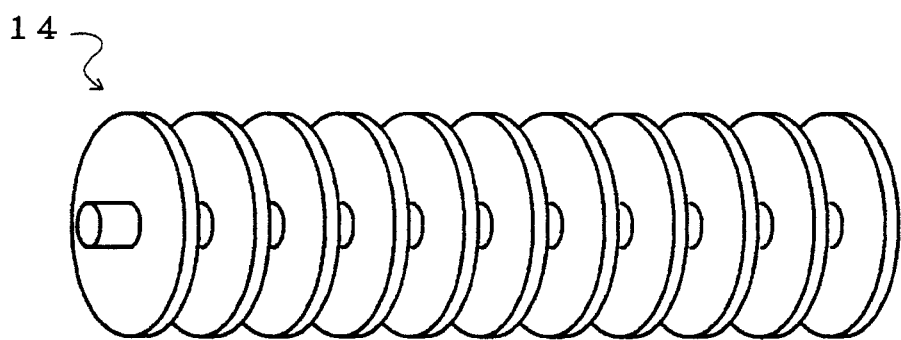
FIG. 2 is a perspective view of an example of a fixation member.

A system for processing chlorofluorocarbons is described as the first embodiment of the present invention with reference to FIG. 1 and FIG. 2. In this embodiment, a typical chlorofluorocarbon CFC-113 ($CCl_2F$—$CClF_2$) is processed with ethane, which is used as a gaseous hydrocarbon for copolymerization. As illustrated in FIG. 1, the chlorofluorocarbon processing system includes a plasma processing chamber 11, a mixing chamber 22 disposed before the plasma processing chamber 11 for mixing a gaseous hydrocarbon with a chlorofluorocarbon, and a chlorofluorocarbon supply line 24 and a hydrocarbon supply line 25 for respectively supplying the chlorofluorocarbon and the gaseous hydrocarbon into the mixing chamber 11. The chlorofluorocarbon supply line 24 connects with a gas tank 29 of a collected chlorofluorocarbon whereas the hydrocarbon supply line 25 connects with a gas tank 33 of a hydrocarbon, ethane in this embodiment. When the collected chlorofluorocarbon is liquid in the ordinary state or at the pressure in the plasma processing chamber 11, a heater (not shown) is required to evaporate the collected chlorofluorocarbon in the gas tank 29. The supply lines 24 and 25 are respectively provided with pressure regulator valves 28, 32, flow meters 27, 31, and open/close valves 26, 30. The chlorofluorocarbon supply line 24 and the hydrocarbon supply line 25 meet after the respective open/close valves 26 and 30 and then connect to the mixing chamber 22. The open/close valves 23 and 21 provided before and after the mixing chamber 22 may be omitted. A vacuum pump 45 is further connected to the plasma processing chamber 11 via a trap 44.

The plasma processing chamber 11 is made of a quartz tube with caps 16 and 17 sealed at both ends. A fixation member 14 is placed in the plasma processing chamber 11 by removing the caps 16 and 17. A high-frequency coil 12 is wound on the tubular body of the plasma processing chamber 11 and is connected to a high-frequency generator 15. The high-frequency generator 15 includes an impedance matching circuit normally used in a polymerization system. One cap 16 connects with a pressure gauge 41 for detecting the pressure in the plasma processing chamber 11.

A gas line 35 disposed at the rightmost position in the drawing of FIG. 1 supplies a purge gas like argon (Ar) or nitrogen ($N_2$) to purge out the residual gas in the plasma processing chamber 11. The gas line 35 is therefore not essential for the structure of the present invention.

A method of processing the collected chlorofluorocarbon with the system thus constructed is described below. The fixation member 14, which preferably has a large surface area, is inserted into the tubular body of the plasma processing chamber 11. FIG. 2 shows an example of the fixation member 14, which may have an arbitrary shape otherwise. After a valve 20 at an inlet of the plasma processing chamber 11 is closed, the plasma processing chamber 11 is evacuated with the vacuum pump 45. A valve 42 at an outlet of the plasma processing chamber 11 is closed after sufficient evacuation, and the valves 20, 21, 23, 26, and 30 disposed before the plasma processing chamber 11 are successively opened. Then the chlorofluorocarbon gas and the gaseous hydrocarbon gas are respectively supplied from the gas tanks 29 and 33 and mixed in the mixing chamber 22. The mixing ratio of the two gases is controlled by changing openings of the pressure regulator valves 28 and 32 based on the reading of the flow meters 27 and 31 of the respective supply lines 24 and 25. After the chlorofluorocarbon gas and the hydrocarbon gas are sufficiently mixed in the mixing chamber 22, the mixed gas 13 is introduced into the plasma processing chamber 11. The amount of the mixed gas 13 supplied into the plasma processing chamber 11 is controlled by reading the pressure gauge 41.

After a preset amount of the mixed gas 13 is introduced into the plasma processing chamber 11, the valve 20 at the inlet of the process chamber 11 is closed, and a high-frequency current (normally, 13.56 MHz) is supplied onto the high-frequency coil 12. Molecules of the mixed gas 13 in the plasma processing chamber 11, that is, $CCl_2F$—$CClF_2$ and $CH_3$—$CH_3$ molecules in this embodiment, are turned into plasma, in which copolymerization of these molecules takes place. Since the copolymers of these molecules are solid in the ordinary state, they are deposited and accumulated on the fixation member 14.

The plasma processing time is predetermined according to results of preparatory experiments to ensure sufficient fixation of the chlorofluorocarbon gas in the plasma processing chamber 11. After the predetermined plasma processing time elapses, the high-frequency current to the high-frequency coil 12 is stopped and the valve 42 at the outlet of the plasma processing chamber 11 is opened to discharge the residual gas with the vacuum pump 45. Copolymerization products that do not attach to the fixation member 14 in the plasma processing chamber 11 are collected in the trap 44. The residual gas discharged with the vacuum pump 45 may be recycled and supplied again to the mixing chamber 22.

After rounds of the above plasma processing operations are successively conducted and a certain amount of the copolymerization products of the chlorofluorocarbon is accumulated onto the fixation member 14, the caps 16 and 17 are removed from the plasma processing chamber 11 to take out the fixation member 14. Thus the chlorofluorocarbon is fixed and become harmless because it does not destroy the ozone layer any more.

The operations of the plasma processing described above, including opening and closing the respective valves and controlling the flow of each material gas, may be automated by using a computer-aided system.

Figure 3:
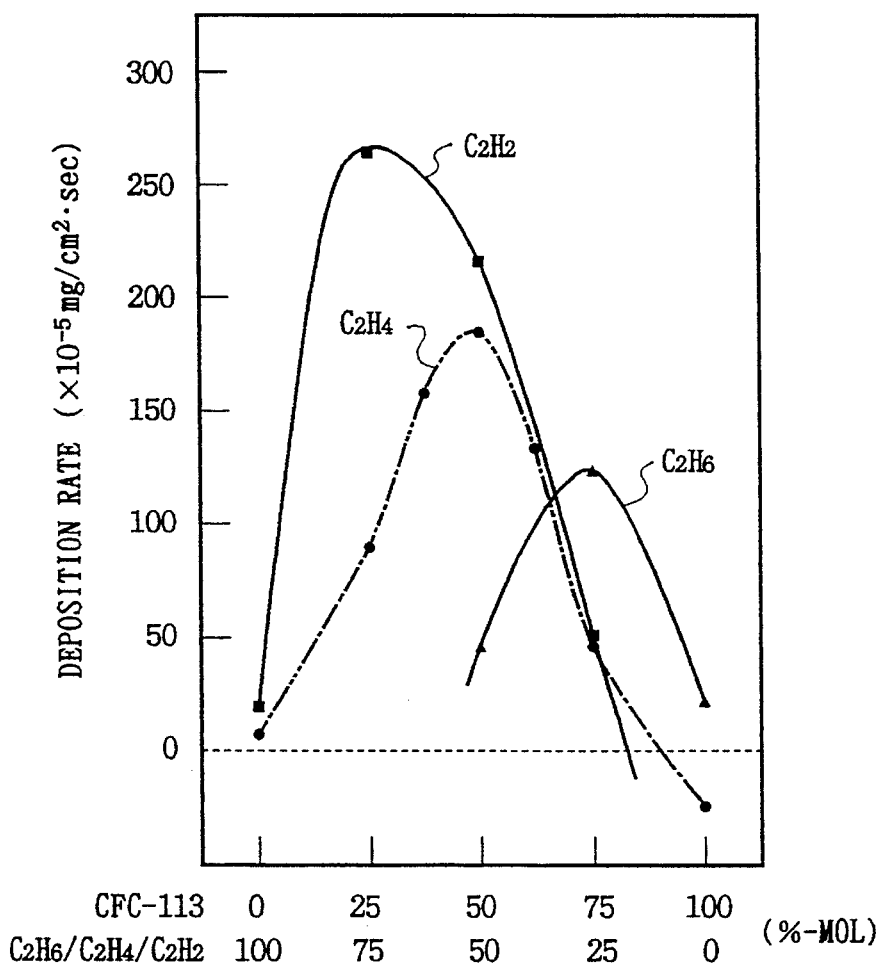
FIG. 3 is a graph showing the relationship between the molar ratio of CFC-113 to hydrocarbon gas and the deposition rate.

Lower hydrocarbons other than ethane, but preferably containing three or less carbon atoms, such as methane, ethylene, acetylene and propane, may be used as the gaseous hydrocarbon mixed with the chlorofluorocarbon. For the respective hydrocarbons, an optimal mixing ratio should be determined to attain a high-rate fixation (or deposition rate), as shown in FIG. 3. Chlorofluorocarbons other than CFC-113 can be processed in the same manner as above.

The system of the first embodiment describe above is a batch processing, where a certain amount of a chlorofluorocarbon is introduced into the plasma processing chamber 11 and is fixed onto the fixation member 14 at a time. A continuous processing system is then described as the second embodiment of the present invention. Although the second embodiment described below illustrates a system for fixing a residual gas discharged from a dry etching apparatus, it is also applicable to collected chlorofluorocarbons.

Figure 4:
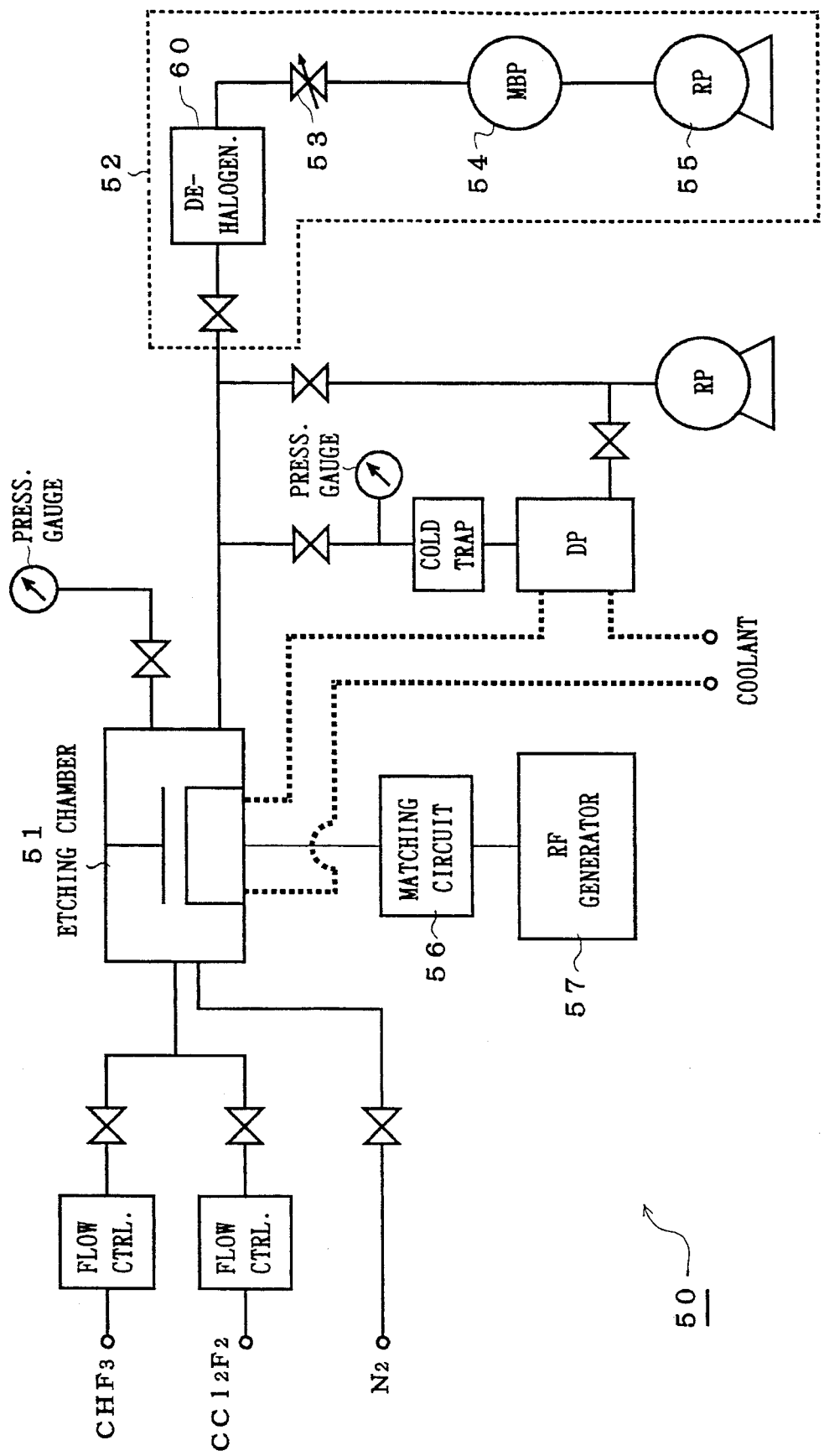
FIG. 4 is a schematic diagram of a dry etching apparatus with a residual gas processing unit as the second embodiment of the present invention.

FIG. 4 illustrates a typical structure of a dry etching apparatus 50, where $CHF_3$ or $CCl_2F_2$ is used as the etching gas. The etching gas is supplied to an etching chamber 51 at a flow of approximately 20 cc/min. The residual etching gas which is not reacted in the etching chamber 51 is discharged from the etching chamber 51 with a mechanical booster pump (MBP) 54 or a rotary pump (RP) 55 of an etching gas exhaust system 52. A residual gas processing unit 60 according to the present invention is arranged in the etching gas exhaust system 52. The etching gas exhaust system 52 is further provided with a throttle valve 53 for regulating the discharging speed.

Figure 5:
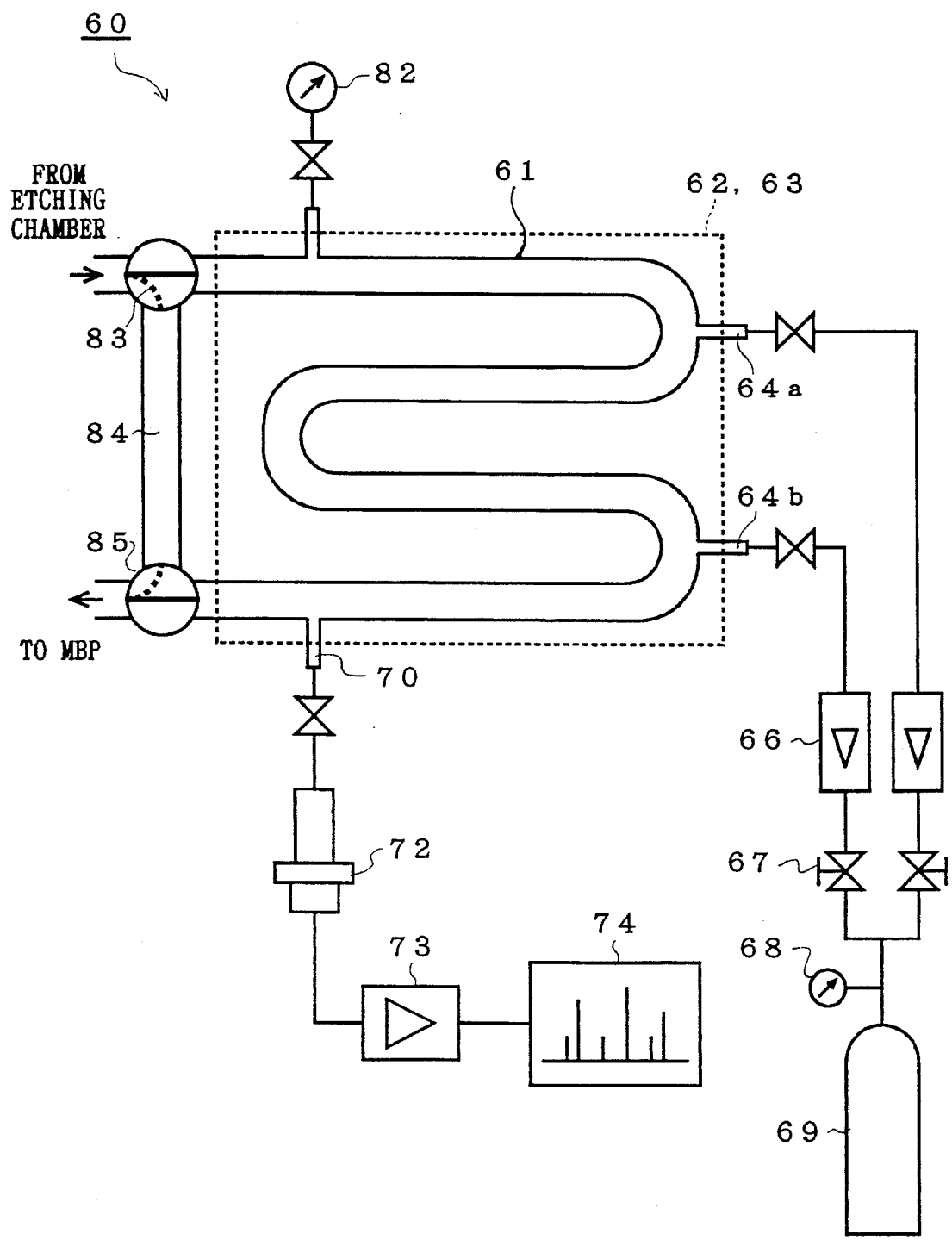
FIG. 5 is a plan view illustrating the residual gas processing unit of the second embodiment.
Figure 6:
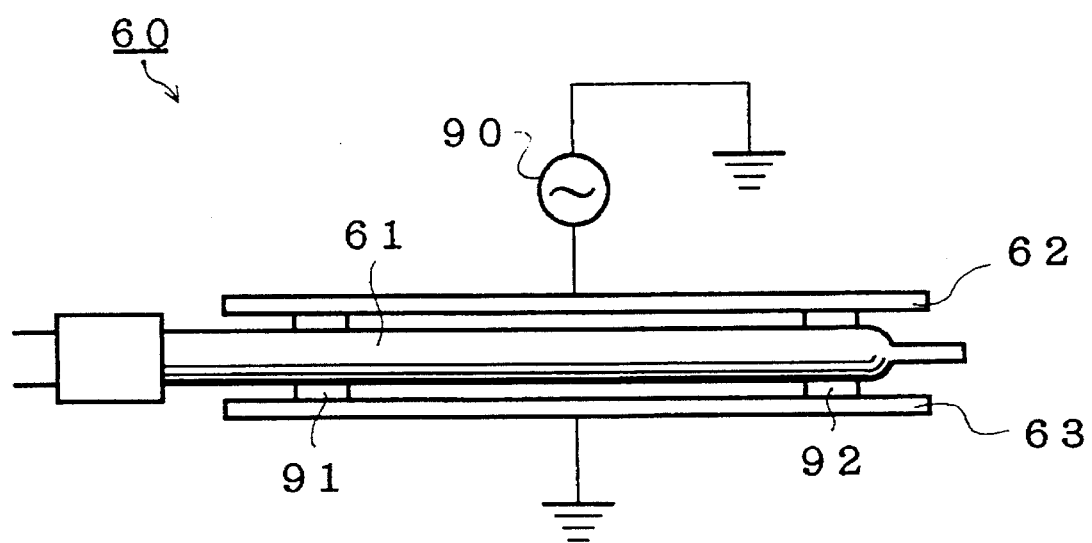
FIG. 6 is a side view of the residual gas processing unit of the second embodiment.

As illustrated in FIGS. 5 and 6, the residual gas processing unit 60 includes a long reaction tube 61 and a pair of high-frequency electrodes 62 and 63 for plasma excitation. An example of the dimensions of the reaction tube 61 is, for the capacity of the dry etching apparatus 50 as described above, 10 to 20 mm in diameter and 1 to 1.5 m in length. The reaction tube 61 is preferably folded in a plane between the pair of electrodes 62 and 63, as shown in FIG. 6, so as to reduce the setting area of the residual gas processing unit 60. The reaction tube 61 may have a different shape, such as a spiral or a three-dimensional shape. The reaction tube 61 has an inlet connected to the etching chamber 51 of the etching apparatus 50 and an outlet connected to the exhaust pump 54 of the etching gas exhaust system 52. The etching gas supplied from the etching chamber 51 continuously flows through the reaction tube 61 during the dry etching process in the etching chamber 51.

The reaction tube 61 is provided with first and second hydrocarbon supply inlets 64a and 64b. A gaseous hydrocarbon, ethylene gas for example, is supplied from a gas tank 69 into the reaction tube 61 via the hydrocarbon supply inlets 64a and 64b. The configuration of providing plural supply inlets is preferable to enhance sufficient plasma copolymerization of the residual gas and the gaseous hydrocarbon, although a single supply inlet may suffice under certain conditions. Supply conduits to the supply inlets 64a and 64b are provided with a pressure gauge 68, pressure regulator valves 67, 67, and flow control units 66, 66. The operator regulates the flow of the gaseous hydrocarbon supplied from both the supply inlets 64a and 64b as monitoring the internal pressure in the reaction tube 61 detected by a pressure gauge 82. When the etching gas used in the dry etching apparatus 50 is $CHF_3$ or $CCl_2F_2$ and the gaseous hydrocarbon supplied into the reaction tube 61 is ethylene gas, the preferable flow of the ethylene gas with respect to the etching gas is 50 to 200% in the molar ratio.

Another outlet 70 leading to a gas analyzer is provided near the outlet of the reaction tube 61 to check whether the gas near the end of the reaction tube 61 has been sufficiently processed. Though a mass analyzer 72 is used in the present embodiment, as shown in FIG. 5, any other analyzers can be used instead, and an analyzer itself is not an essential element of the present invention.

With further reference to FIG. 6, the reaction tube 61 is interposed between a pair of high-frequency electrodes 62 and 63 via insulators 91 and 92. The pair of high-frequency electrodes 62 and 63 are connected to a 13.56 MHz high-frequency power source 90. The high-frequency power source 90 includes an impedance matching circuit as in conventional polymerization systems. A 2.45 GHz microwave power source or other plasma generator may be used instead of the high-frequency power source 90. It is also possible to commonly use the RF generator 56 and a matching circuit 57 used for the dry etching apparatus 50 instead of the independently provided high-frequency power source 90. A high-frequency coil used in the first embodiment may also be used as the plasma generator.

Figure 7A:
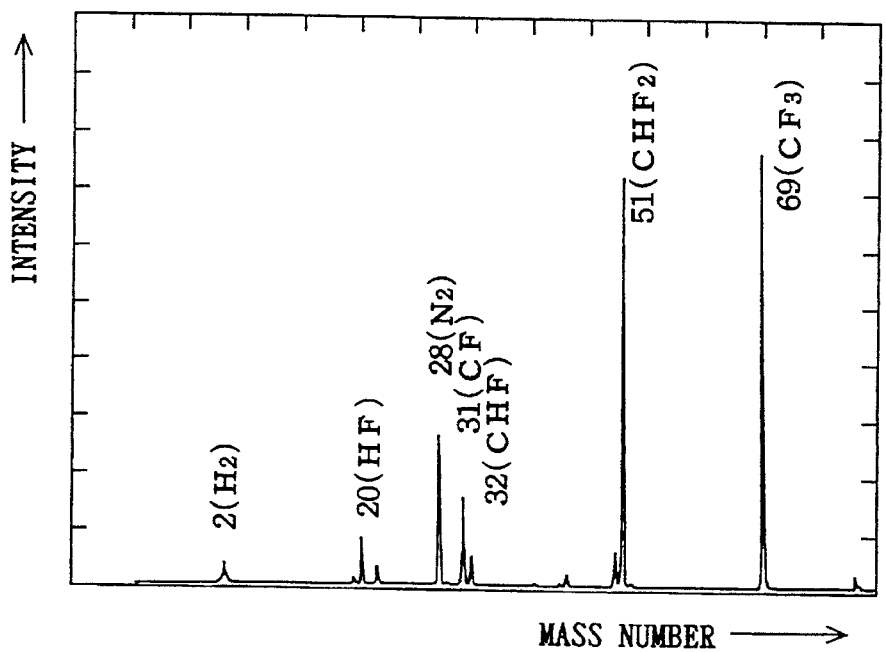
FIGS. 7A and 7B are graphs respectively showing mass spectra of a non-processed residual gas discharged from the dry etching apparatus and of a processed gas.
Figure 7B:
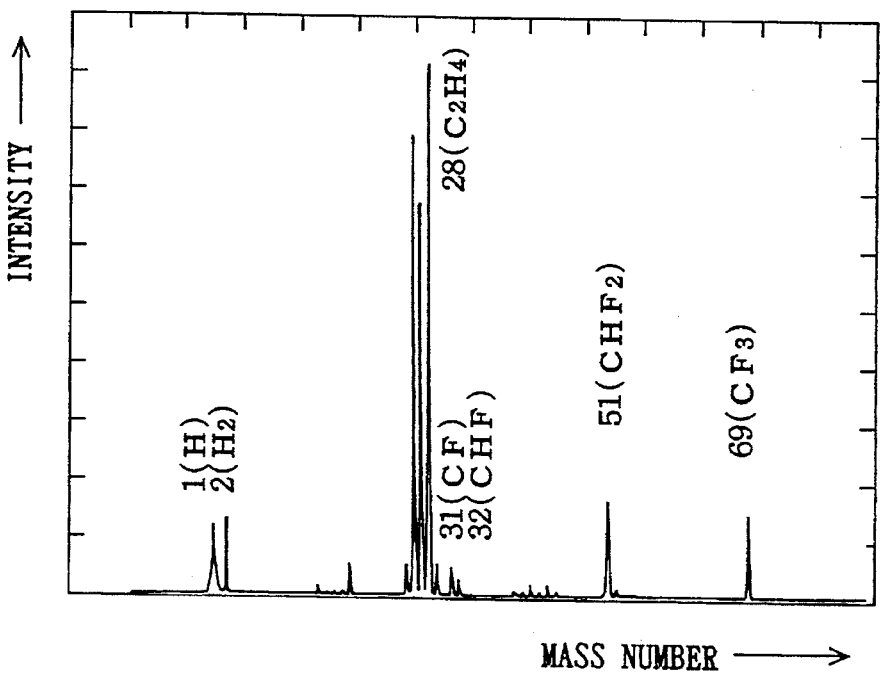

FIG. 7A shows a mass spectrum of the non-processed etching gas discharged from the etching chamber 51, when the etching gas CHF$_3$ is supplied into the dry etching apparatus 50 at the flow rate of 20 cc/min. Peaks of the non-reacted CHF$_3$ gas as well as the plasma excitation products CHF$_2$, CF$_3$, CF, and HF are noticeable. FIG. 7B shows a mass spectrum of the processed etching gas, when the ethylene gas is supplied through the first hydrocarbon supply inlet 64a at the flow rate of 20 cc/min and a high-frequency power of approximately 10 W is supplied between the pair of high-frequency electrodes 62 and 63 for the plasma copolymerization in the reaction tube 61. The peaks of CHF$_2$ and CF$_3$ are significantly lowered and the peak of HF (mass number: 20) completely disappears. In this measurement, the ethylene gas is supplied only from the first supply inlet 64a. Thus, introduction of the ethylene gas through both the first and the second supply inlets 64a and 64b removes almost all of the non-reacted gas discharged from the etching chamber 51.

Since the copolymer thus produced is accumulated onto the inner wall of the reaction tube 61, the reaction tube 61 is replaced at preset intervals. The reactive etching gas of halogenated hydrocarbons and chlorofluorocarbons are thus changed to high-molecular polymers and completely fixed in the reaction tube 61 without causing undesirable later desorption. It is possible to place a fixation member having a large surface area, as in the first embodiment, in the reaction tube 61. In this case, the fixation member should be shaped having less flow resistance.

It is possible to provide a bypass 84 and three-way valves 83 and 85 between the inlet and the outlet of the residual gas processing unit 60. When the residual gas processing unit 60 is not used, the discharged gas is guided through the bypass 84.

FIG. 3 shows the graph of deposition rate of the polymerization products and the mixing ratio of the CFC-113 and hydrocarbons of ethane, ethylene and acetylene using the continuous gas processing system as shown by the unit 60. It is apparent from the graph that the peak position of the deposition rate shifts toward larger ratio of hydrocarbon gas as the number of carbon atoms decreases in a hydrocarbon molecule, as ethane—ethylene—acetylene, and the maximum deposition rate increases in this order. It is preferable to select an appropriate hydrocarbon gas considering the cost of those hydrocarbon gases and the deposition rate characteristics shown in FIG. 3.

In the continuous type processing unit 60 described above, hydrocarbon gas is added in the halogenated hydrocarbon gas or chlorofluorocarbon gas flowing in the reaction tube 61. It is of course possible to introduce the two gases simultaneously in the reaction tube, and it is further possible to reverse the order, that is, to add halogenated hydrocarbon gas or chlorofluorocarbon gas to a hydrocarbon gas flow.

There may be many modifications, alternations, and changes without departing from the scope or spirit of essential characteristics of the invention. It is thus clearly understood that the above embodiments are only illustrative and not restrictive in any sense.

The scope and spirit of the present invention are limited only by the terms of the appended claims.

What is claimed is:

1. A method of processing a chlorofluorocarbon gas waste material comprising the steps of:
    a. mixing a hydrocarbon gas with the chlorofluorocarbon gas waste material to create a mixed gas; and
    b. exciting the mixed gas to a plasma state for plasma copolymerization, generating a copolymer of molecules of the chlorofluorocarbon gas waste material and the hydrocarbon gas, the copolymer being accumulated on a fixation member, wherein a majority of chlorofluorocarbons in said chlorofluorocarbon gas waste material is prevented by said method of processing from being atmospherically released.

2. The chlorofluorocarbon processing method according to claim 1, wherein the chlorofluorocarbon gas is CFC-113, and the hydrocarbon gas is a lower hydrocarbon gas containing three or less carbon atoms.

3. The chlorofluorocarbon processing method according to claim 1, wherein the chlorofluorocarbon gas is CFC-113, the hydrocarbon gas is ethane gas, and the molar mixture ratio is [CFC-113]:[ethane]=50:50–90:10.

4. The chlorofluorocarbon processing method according to claim 1, wherein the chlorofluorocarbon gas is CFC-113, the hydrocarbon gas is ethylene gas, and the molar mixture ratio is [CFC-113]:[ethylene]=25:75–75:25.

5. The chlorofluorocarbon processing method according to claim 1, wherein the chlorofluorocarbon gas is CFC-113, the hydrocarbon gas is acetylene gas, and the molar mixture ratio is [CFC-113]:[acetylene]=15:85–65:35.

6. The method according to claim 1, wherein said chlorofluorocarbon gas waste material is discharged from a dry etching apparatus for the mixing with said hydrocarbon gas.

7. The method according to claim 1, wherein said chlorofluorocarbon gas waste material is discharged from a waste storage container for mixing with said hydrocarbon gas.

\* \* \* \* \*